(No Model.)
J. A. EVERITT.
CULTIVATOR.
No. 467,226. Patented Jan. 19, 1892.
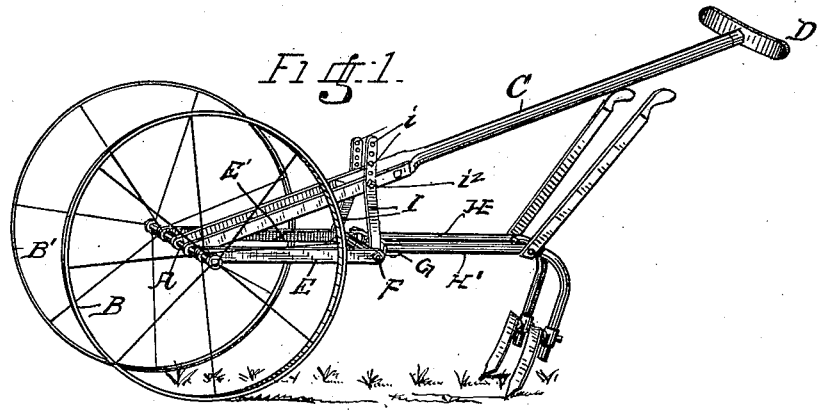
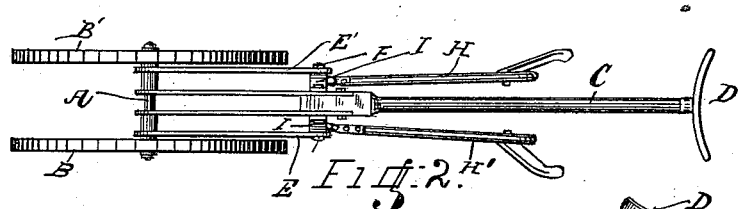
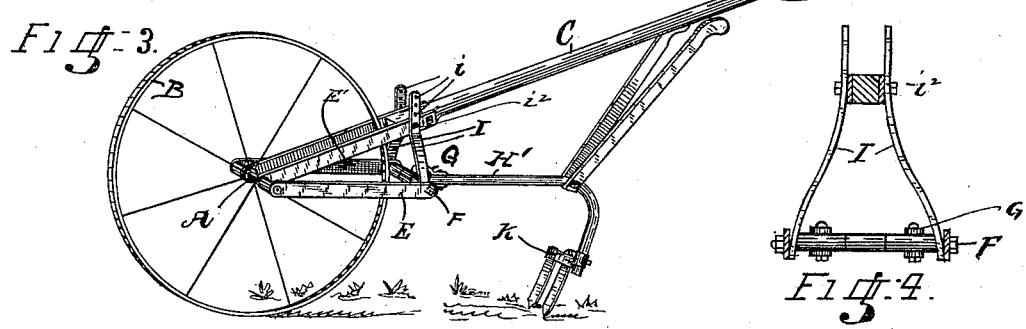
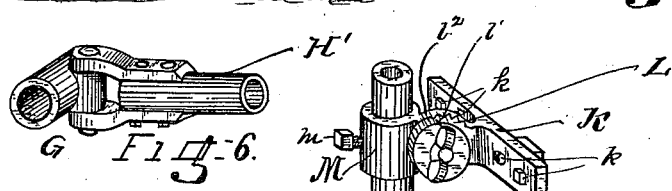
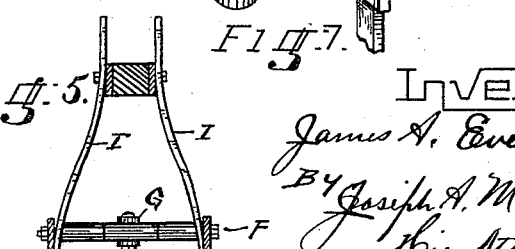
Witnesses:
Fred Knodle.
Frank W. Warner.
Inventor:
James A. Everitt
By Joseph A. Minturn
His Attorney.

UNITED STATES PATENT OFFICE.

JAMES A. EVERITT, OF INDIANAPOLIS, INDIANA.

CULTIVATOR.

SPECIFICATION forming part of Letters Patent No. 467,226, dated January 19, 1892.

Application filed January 15, 1891. Serial No. 377,917. (No model.)

*To all whom it may concern:*

Be it known that I, JAMES A. EVERITT, a citizen of the United States, residing at Indianapolis, in the county of Marion and State of Indiana, have invented certain new and useful Improvements in Garden-Cultivators; and I do hereby declare the following to be a full, clear, and exact description of the invention, such as will enable others skilled in the art to which it appertains to make and use the same.

This invention relates to improvements in garden-cultivators and to that class which is operated by being pushed in advance of the workman.

The objects of the invention are, first, to provide means for propelling the cultivator by the direct pressure from the body of the operator, which enables him to exert more power with less fatigue and strain than can be applied in any other way and leaves both hands free to guide the plow or other implement near the plants; second, to provide a hinged plow-beam having vertical and horizontal movement under full control of the operator's hands, whereby the depth of tillage and proximity of cultivation to the growing vegetables may be carefully regulated; third, to provide means for adjusting the implement to persons of different height and for regulating the vertical adjustment or pitch of the attachments with relation to the plow-beam, and, fourth, to provide a convertible machine. It is well known that for the cultivation of plants at certain times, more especially while they are small, a wheeled cultivator to do good, close, and satisfactory work must cultivate both sides of the row at one passage; but for late tendings of such crops as onions, celery, corn, &c., which grow too tall to be cultivated on both sides at once, nothing will give satisfaction, except an implement that will work between the rows, and it is one of the chief objects of this invention to combine in a single machine an implement that can be quickly and easily converted from a double-wheeled cultivator adapted to work both sides of a row at one passage to a single-wheeled implement adapted to work between the rows, and that can as readily be reconverted into a two-wheeled machine.

I accomplish the foregoing objects by the mechanism illustrated in the accompanying drawings, in which—

Figure 1 is a view in perspective of a garden-cultivator constructed in accordance with this invention, and represents the machine in the form of a two-wheeled implement for cultivating on both sides of the row at once; Fig. 2, a top view of same; Fig. 3, a view in perspective of my cultivator as it appears after it has been converted into a single-wheeled implement for cultivating between the rows; Fig. 4, a detail of the bolt to which the plow-beams are hinged, and shows both of the beams attached, and illustrates the push-bar in cross-section and the brace-rods connecting the bolt with the push-bar; Fig. 5, a detail of same, showing only one of the plow-beams attached; Fig. 6, a detail in perspective of the compound hinge by which the plow-beam is connected with the machine; Fig. 7, a detail of the attachment for securing the interchangeable tools and adjusting same.

Similar letters refer to like parts throughout the several views.

A is a metallic spindle or shaft, on the ends of which are loosely mounted the driving-wheels B B'. To the shaft A, at a point midway between the wheels B B', is secured a push-bar C, upon the upper opposite end of which is a curved push-yoke D, which is adapted to fit against the body of the operator and enable him to propel the machine. The lower end of the push-bar C is bifurcated for purposes hereinafter fully explained. In the construction shown in the drawings the upper portion of the bar is of wood and in one piece, and the lower or bifurcated section formed by bolting two pieces of strap-iron to the opposite sides of the one-piece upper part. As this construction might be varied without departing from the spirit of this invention—viz., by forming a one-piece fork with a socket to receive a wood or metallic upper shaft, &c.—it is not desired to limit this invention to the exact construction here shown. The push-bar is secured to the shaft by passing the latter through holes formed in each fork.

E and E' are bars secured to the shaft, one on each side of the push-bar, between the push-bar and the wheels. These bars E and E' extend back from the axle in the direction of the operator to such a distance beyond the rim of the wheels as will allow free side movement of the plow-beams without contact between the beams and the wheels. The outer ends of the bars E E' are joined together by a connecting-rod F, to which rod the plow-beams H H' are secured by the compound joint G. The joint G is for the purpose of allowing free vertical and horizontal adjustment of the plow-beams, in order that the implement to act on the soil, which is attached to the beam, may be fully under the control of the workman.

I are braces extending from the bars E E' to the push-bar. The upper ends of the braces are provided with a series of holes $i$ for the reception of the bolt $i^2$, by which the two braces are connected with the bar. The series of holes $i$ allow an adjustment by which the distance between the plow-beams and the push-bar is varied to suit the height of the operator, and also in a measure to regulate the depth of tillage.

The two bars E E', the two braces I, and the plow-beams are all connected by the bolt $i^2$, which is inserted through suitable openings made for that purpose in each of the parts to be connected. The bolt is provided with a head on one end and a nut on the end opposite to hold it in place.

A handle for each plow-beam will be connected therewith in any suitable manner, and the implement to act on the soil will be secured to the free end of the plow-beam.

It is a common practice among manufacturers of garden-plows to furnish attachments for different kinds of work and all adapted to be used on the same machine, but in most instances not interchangable with other machines, or, in other words, not adapted to be used on machines made by other firms. Some are provided with a socket, into which the end of the beam is inserted and fastened by a set-screw, while others are made to be bolted to a plate which must stand at a certain angle, and in order to adapt my cultivator to any of the attachments in common use and which the gardeners in many instances already own I provide an attachment, as shown in Fig. 3 and in Fig. 7. This consists in a plate K, having a series of holes $k$, to which the implements to act on the soil may be bolted and the proper pitch or angle obtained by the vertical joint L. One part $l'$ of this joint is integral with the plate K and the other part $l^2$ with a sleeve M, which has vertical and rotary adjustment on the end $h$ of the plow-beam, and is adapted to be fastened at any point by the set-screw $m$. The contacting-faces of the joint L may be corrugated to prevent slipping and will be forced together by tightening the nut on the bolt connecting the two sections.

The mechanism hereinbefore described constitutes the two-wheeled cultivator adapted to cultivate on both sides of the row at one passage. To convert this machine into a one-wheeled cultivator for plowing between the rows, the shaft A is removed by screwing off the nut at one end and slipping the shaft out from the opposite side. One of the wheels will not be needed and will be laid aside, and the other wheel will be placed between the two forks on the lower end of the push-bar. The shaft will now be replaced with the bars E E' in the same position as before on each side of the push-bar. The width of the machine will be narrowed up the width of the two wheels, and, if desired, a short auxiliary spindle or shaft may be used in place of the long one, or washers may be added to fill out the blank spaces on the spindle formerly occupied by the wheels. The next step is to remove one of the plow-beams, which is done by withdrawing the bolt F exactly in the same manner as described for the removal of the spindle A. When the bolt is withdrawn, one of the plow-beams will be laid aside and the other one adjusted midway between the ends of the replaced bolt, where it will be retained by suitable washers, which will be added on each side thereof to fill the space previously occupied by the second beam. To complete the transformation, the plow-handle on the discarded beam; or, if preferred, an extra handle kept for this purpose, will be bolted to the remaining beam, as shown in Fig. 3.

By reversing the operations as above described the single-wheeled plow may be reconverted into the two-wheeled machine.

I claim—

In a garden-cultivator, the combination, with a shaft A and wheel or wheels B B', of a bifurcated push-bar secured to said shaft, parallel bars E E', secured at their front ends upon the shaft A and at their rear ends by a bolt F, one or more plow-beams secured upon the bolt F by a joint G, which allows the beam both vertical and horizontal play, substantially as set forth.

In testimony whereof I affix my signature in presence of two witnesses.

JAMES A. EVERITT.

Witnesses:
JOSEPH A. MINTURN,
LOVRA EVERITT.